Figure 1:
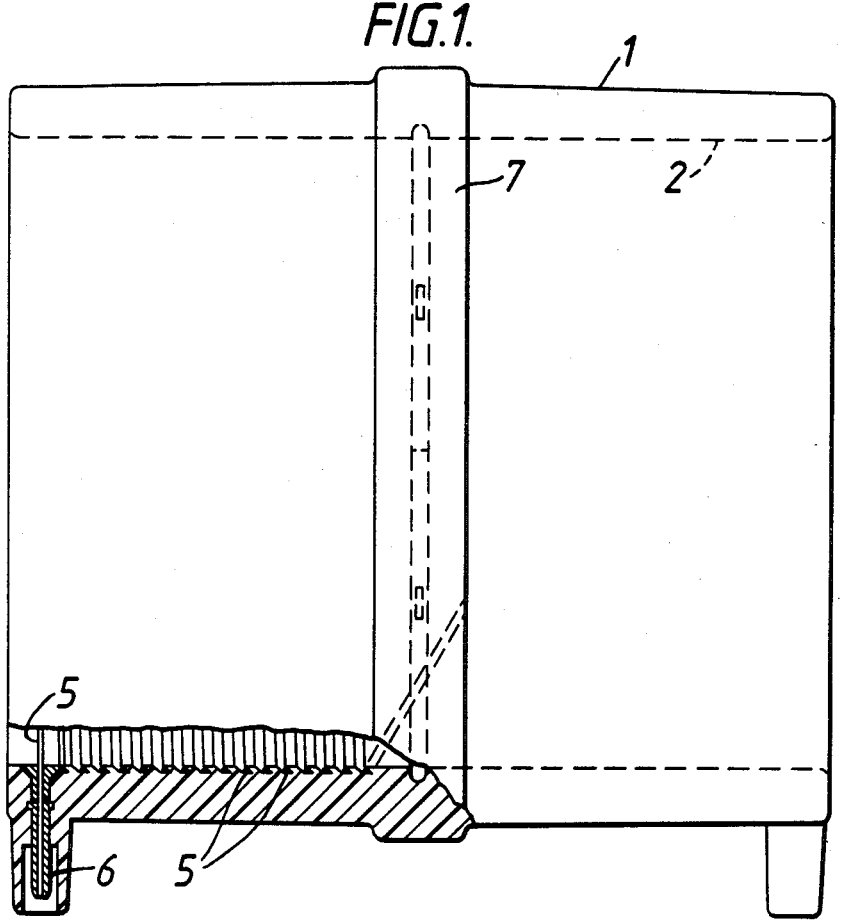

United States Patent [19]

Ansell

[11] Patent Number: 4,622,087
[45] Date of Patent: Nov. 11, 1986

[54] METHOD OF MAKING WELDABLE PIPE FITTINGS

[75] Inventor: Donald J. Ansell, Leicestershire, England

[73] Assignee: The Victaulic Company PLC, Hertfordshire, England

[21] Appl. No.: 577,075

[22] Filed: Feb. 6, 1984

[30] Foreign Application Priority Data

Feb. 18, 1983 [GB] United Kingdom ................. 8304630
Mar. 1, 1983 [GB] United Kingdom ................. 8305541

[51] Int. Cl.$^4$ ............................................ B32B 31/18
[52] U.S. Cl. .................... 156/242; 156/257; 156/268; 156/293; 219/535; 219/544; 285/21
[58] Field of Search .............. 285/21, 22; 156/138, 156/140, 143, 144, 257, 268, 293, 242, 245; 219/535, 544

[56] References Cited

U.S. PATENT DOCUMENTS 4,455,482  6/1984  Grandclement .................... 219/535

FOREIGN PATENT DOCUMENTS 825165  2/1938  France ................................. 156/257

Primary Examiner—Caleb Weston
Attorney, Agent, or Firm—Kinney & Lange

[57] ABSTRACT

A method of forming weldable pipe fitting including a thermoplastic sleeve comprising the steps of incising around the internal wall of the sleeve a helical cut inclined to the surface of the wall along the line of the cut, the cutting tool and its angular relationship to the bore of the sleeve being chosen such that during incision an internally extending flap of thermoplastic material produced by the incision is caused to open out and deform transverse to the direction of incision whereby a helical cavity is formed within the sleeve wall; feeding into said cavity an electrically conducting wire; anchoring the ends of the electrical wire; and treating the internal surface of the sleeve so as to hold the wire within said cavity.

10 Claims, 2 Drawing Figures

METHOD OF MAKING WELDABLE PIPE FITTINGS

This invention relates to weldable pipe fittings, by which is meant hollow thermoplastic fittings for connecting to thermoplastic pipes or pipe like members in which a part of an inner peripheral wall of the fitting is arranged to be joined by fusion or "welding" to a part of an outside peripheral wall of a pipe or pipe like member. The invention relates more particularly to the production of such weldable fittings adapted to be fused to the outside periphery of a pipe or pipe-like member by means of an electric heating wire embedded within the fitting or within the pipe or pipe like member.

It has already been proposed to provide a hollow plastic fitting of this kind in which a helical groove is formed around the inner wall of the fitting within which is located an electrically conducting wire, so that when in use the fitting is placed in mating contact about a thermoplastic pipe or pipe like member and electric current passed through the electric wiring, melting of the closely adjacent mating plastic surfaces of the fitting and pipe occurs and fusion or "welding" between the two bodies takes place.

It is an object of the present invention to enable the formation of a weldable thermoplastic fitting of simplified and improved construction.

According to one aspect of the invention there is provided a method of forming a weldable pipe fitting including a thermoplastic sleeve comprising incising around the internal wall of the sleeve a helical cut inclined to the surface of the wall along the line of cut, the cutting tool and its angular relationship to the bore of the sleeve being chosen such that during incision an internally extending flap of thermoplastic material produced by the incision is caused to open out and deform transverse to the direction of incision whereby a helical cavity is formed within the sleeve wall; feeding into said cavity an electrically conducting wire; anchoring the ends of the electrical wire; and treating the internal surface of the sleeve so as to hold the wire within said cavity. The treatment of the internal surface of the sleeve may comprise working so as to lay, at least partially, the flap against the wall.

It is believed that the deformation of the flap of material is caused by mechanical force.

According to another aspect of the present invention there is provided a weldable pipe fitting including a thermoplastic sleeve having a bore and an internal wall defining said bore, a helical cut formed around the internal wall of the sleeve, the cut being inclined to the surface of the wall along the line of cut, and an electrically conducting wire disposed in a helical cavity formed between the cut and a flap of the thermoplastic material produced by the cut in the internal wall of the sleeve, the ends of the conducting wire being anchored to the fitting.

The helical incision may extend fully across the fitting but may not be at the same pitch across the fitting. Thus it may increase in angle over a portion between the two ends thereof so that a relatively close helical pitch is only obtained at each end of the fitting at which the fitting is normally secured to pipes. The electrical wire may be inserted manually within the cavity formed by the incision or may be inserted mechanically. Alternatively, the wire may be fed into the cavity immediately upon its formation by means of a suitable feed means within the incision tool.

In one embodiment of the invention, after completion of the formation of the incised helix and the insertion of the electrical wire, the anchor points of the wire are provided with electrical terminal caps, and the flaps incised from the helix are "ironed" back into conformity with the inner wall of the sleeve by the passage of a mandrel, which may be heated, through the fitting. In addition, a controlled electrical current may be passed through the electrical wire to be encapsulated into the inner wall of the fitting.

To ensure central registration of the pipe or pipes being joined by the fitting, physical shoulder stops may be incorporated into a central portion of the bore of the sleeve.

It is to be understood that the method of formation of fitting herein above specified can be applied not only to fittings providing a straight through connection for pipes, but also to similar pipe fittings such as couplers, tees, 45° and 90° elbows, flange adapters and reducers, for example. In other words the invention is applicable to many varieties of pipe fittings adapted to be fitted over pipes or pipe like members.

In a further embodiment of the invention we have found that by means of the invention it is possible to achieve satisfactory welded thermoplastic fitting/pipe connections even where tolerances between the fitting and the associated pipe are not fully satisfactory. Thus, we have found that it is possible to achieve satisfactory fusion between a fitting and a pipe having significant differences in respective internal and external dimensions. Thus we have found that if a moulded fitting is taken from its forming mould and plunged, whilst still warm or hot, into a chill bath, for example of refrigerated water, the normal shrinkage of the fitting on cooling is at least partly arrested. After subjection to the chill bath the fitting can, in accordance with usual practice, be stored for some days for normal stress relief purposes, machine bored to standard tolerance requirements, and provided with an inserted electrical wire in accordance with the invention. In use such a fitting is placed about thermoplastic pipes for connection thereto, and a fusion current is passed through the electrical wire. This has the effect of heating the fitting so that the previously arrested shrinkage of the fitting is released and a tight fit of the fitting upon the pipes is provided. This feature enables fittings to be able to cope with very large tolerance differences between pipes and fittings.

The invention can in an alternative arrangement be applied by the incision of an inclined helical cut made around the outer periphery of a pipe or pipe like member prior to the insertion, in accordance with the invention, of an electrical wire within the incised cavity below the flap formed by means of the incision. In such an arrangement the fitting will be fitted over the pipe like member incorporating the encapsulated electrical wire and fused thereto.

Figure 2:
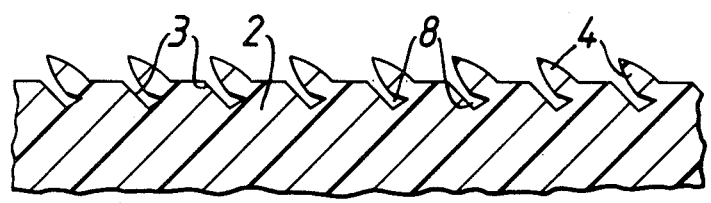

In order that the invention may be more readily understood one embodiment thereof will now be described by way of example with reference to the accompanying drawings in which:

FIG. 1 is part sectional elevation of a pipe coupling formed according to the invention; and FIG. 2 is an enlarged section of part of the internal wall of the coupling of FIG. 1 during formation.

In FIG. 1 there is illustrated a pipe coupling 1 comprising a sleeve of thermoplastic material. Incised within the internal wall or bore 2 of the coupling is a helical cut 3 (as seen in FIG. 2) formed at an inclined angle of approximately 30° to 60° to the plane of the bore at the point of incision. As can be seen the incision has been made such that the flap 4 partially cut free thereby has been subjected to force and has expanded so as to define with the cut a cavity 8 beneath the internal wall of the fitting into which an electrically conducting wire 5 can be fed. Thereafter an internal mandrel is passed through the fitting to compress the internal wall back into desired dimensions.

As can be seen in FIG. 1 the wire 5 passes in helix from one end of the coupling to the other terminating in brass terminals 6 at each end. It is to be noted that whereas at each end the helix of the wire 5 is at a relatively close angled pitch, over the central band 7 of the coupling (within which no pipe to be connected normally extends) the angle of pitch is substantially increased so that the wire traverses this band over a relatively short length.

By means of the invention as hereinbefore described, a convenient and effective method is provided whereby an electrically conductive wire for fusion weldable thermoplastic fittings can be embedded just below the surface of one of the respective mating surfaces of the fitting and a thermoplastic pipe.

I claim:

1. A method of forming a weldable pipe fitting including a thermoplastic sleeve having a bore and an internal wall defining said bore, comprising the steps of incising around the internal wall of the sleeve a helical cut inclined to the surface of the wall along the line of cut by means of a cutting tool, the cutting tool and its angular relationship to the bore of the sleeve being chosen such that during incision an internally extending flap of thermoplastic material produced by the incision is caused to open out and deform transverse to the direction of incision whereby a helical cavity is formed within the sleeve wall; feeding into said cavity an electrical conducting wire; anchoring the ends of the electrical wire; and treating the internal surface of the sleeve so as to hold the wire within said cavity.

2. A method as claimed in claim 1 wherein the treatment of the internal surface of the sleeve comprises working the surface so as to lay, at least partially, the flap against that wall.

3. A method as claimed in claim 1 wherein the pipe fitting includes a double ended thermoplastic sleeve for the connection of two pipes or pipe like members.

4. A method as claimed in claim 3 wherein the helical incision extends substantially fully across the sleeve and the pitch of the helical incision increases in angle over a mid-portion between the two ends of the sleeve.

5. A method as claimed in claim 1 wherein the electrical wire is inserted mechanically within the cavity formed in the incision.

6. A method as claimed in claim 1 wherein the electrical wire is fed into the cavity immediately upon its formation by feed means incorporated within the cutting tool.

7. A method as claimed in claim 1 wherein the anchor points of the electrical wire are provided with electrical terminal caps.

8. A method as claimed in claim 1 wherein, after insertion of the conducting wire into the helical cavity, a mandrel is passed through the sleeve so as to lay the flap against the internal wall of the sleeve.

9. A method as claimed in claim 8 wherein electrical current is passed through the conducting wire as the mandrel is passed through the sleeve.

10. A method as claimed in claim 1 wherein the fitting is a moulding and is taken from its forming mould and plunged, whilst still warm, into a chill bath.

* * * * *

UNITED STATES PATENT AND TRADEMARK OFFICE
CERTIFICATE OF CORRECTION

PATENT NO. : 4,622,087

DATED : November 11, 1986

INVENTOR(S) : Donald J. Ansell

It is certified that error appears in the above-identified patent and that said Letters Patent is hereby corrected as shown below:

On the Title Page Item [73] should read:

--Assignee: The Victaulic Company PLC,
Hertfordshire, England
Rutland Plastics Limited
Leicestershire, England--

Signed and Sealed this

Twenty-fourth Day of March, 1987

Attest:

DONALD J. QUIGG

*Attesting Officer*  *Commissioner of Patents and Trademarks*